US009053901B2

(12) United States Patent
Danyluk et al.

(10) Patent No.: US 9,053,901 B2
(45) Date of Patent: Jun. 9, 2015

(54) X-RAY SYSTEM WINDOW WITH VAPOR DEPOSITED FILTER LAYER

(71) Applicant: General Electric Company, Schenectady, NY (US)

(72) Inventors: Michael John Danyluk, Milwaukee, WI (US); William John Schaefer, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 13/723,683

(22) Filed: Dec. 21, 2012

(65) Prior Publication Data

US 2014/0177809 A1 Jun. 26, 2014

(51) Int. Cl.

| | |
|---|---|
| ***H01J 5/18*** | (2006.01) |
| ***H01J 35/18*** | (2006.01) |
| ***G21K 3/00*** | (2006.01) |
| ***G01N 23/223*** | (2006.01) |
| ***G21K 1/10*** | (2006.01) |

(52) U.S. Cl.
CPC .. *H01J 35/18* (2013.01); *G21K 1/10* (2013.01)

(58) Field of Classification Search
CPC ... G01N 23/223; H01J 2235/087; H01J 35/18
USPC .................................. 378/140, 161, 156, 119
See application file for complete search history.

(56) References Cited

U.S. PATENT DOCUMENTS

| | | | | |
|---|---|---|---|---|
| 6,118,852 | A * | 9/2000 | Rogers et al. | 378/140 |
| 6,301,332 | B1 | 10/2001 | Rogers et al. | |
| 6,418,193 | B1 * | 7/2002 | Albagli | 378/158 |
| 6,683,934 | B1 | 1/2004 | Zhao et al. | |
| 6,699,336 | B2 | 3/2004 | Turner et al. | |
| 2004/0131936 | A1 | 7/2004 | Turner et al. | |
| 2009/0041196 | A1 * | 2/2009 | Matoba et al. | 378/140 |
| 2009/0279669 | A1 | 11/2009 | Allen et al. | |
| 2012/0051496 | A1 * | 3/2012 | Wang et al. | 378/4 |

* cited by examiner

*Primary Examiner* — Nikita Wells
(74) *Attorney, Agent, or Firm* — Rathe Lindenbaum LLP

(57) ABSTRACT

An x-ray system includes x-ray tube containing a cathode which supplies electrons and an anode which can be maintained at high positive electrical potential to the cathode and has a target area which is impacted by electrons from the cathode when the positive potential is maintained generating x-rays. The x-ray tube is enclosed in a radiation resistant casing. The radiation resistant casing has a window which allows some of the x-rays generated at the target area to exit the system. The window has a vapor deposited layer of a filtering metal of sufficient thickness to effectively condition the x-rays passing through the window and located to intercept the x-rays passing through the window.

17 Claims, 3 Drawing Sheets

X-RAY SYSTEM WINDOW WITH VAPOR DEPOSITED FILTER LAYER

BACKGROUND

X-ray tubes for the production of x-rays for imaging including the medical imaging of human patients are typically provided with filters which condition the x-ray beam used for imaging. These filters attenuate certain x-rays in the beam to better suit the x-ray beam to a particular imaging task. For instance, for the medical imaging of human patients the softer x-rays which are likely to be absorbed by the tissue of the patient are filtered out of the beam. Some conditioning requires the use of metal filters which are adhered to the x-ray tube. For instance, in x-ray tubes for the medical imaging of human patients a 75 micron sheet of pure copper is adhered to the aluminum window which allows the x-rays to exit the tube for imaging. In some cases this copper sheet is protected by a polymer sheet which is in turn affixed to the aluminum window such that the x-rays used for imaging pass through the thickness of the copper sheet.

SUMMARY

In one embodiment an x-ray system includes x-ray tube containing a cathode which supplies electrons and an anode which can be maintained at high positive electrical potential to the cathode and has a target area which is impacted by electrons from the cathode when the positive potential is maintained generating x-rays. The x-ray tube is enclosed in a radiation resistant casing. The radiation resistant casing has a window which allows some of the x-rays generated at the target area to exit the system. The window has a vapor deposited layer of a filtering metal of sufficient thickness to effectively condition the x-rays passing through the window and located to intercept the x-rays passing through the window.

Another embodiment includes a process for the construction of an x-ray system. The x-ray system includes one or more conditioning filters having an x-ray tube. The x-ray tube includes a cathode which supplies electrons and an anode which can be maintained at high positive electrical potential to the cathode and has a target area which is impacted by electrons from the cathode when the negative potential is maintained generating x-rays which is enclosed in a radiation resistant casing. The casing has a window which allows some of the x-rays generated at the target area to exit the system. The window has one or more layers of a filtering metal of sufficient thickness to effectively condition the x-rays passing through the window and located to intercept the x-rays passing through the window. A layer of filtering metal is vapor deposited on a surface of the window.

DETAILED DESCRIPTION

Figure 1:
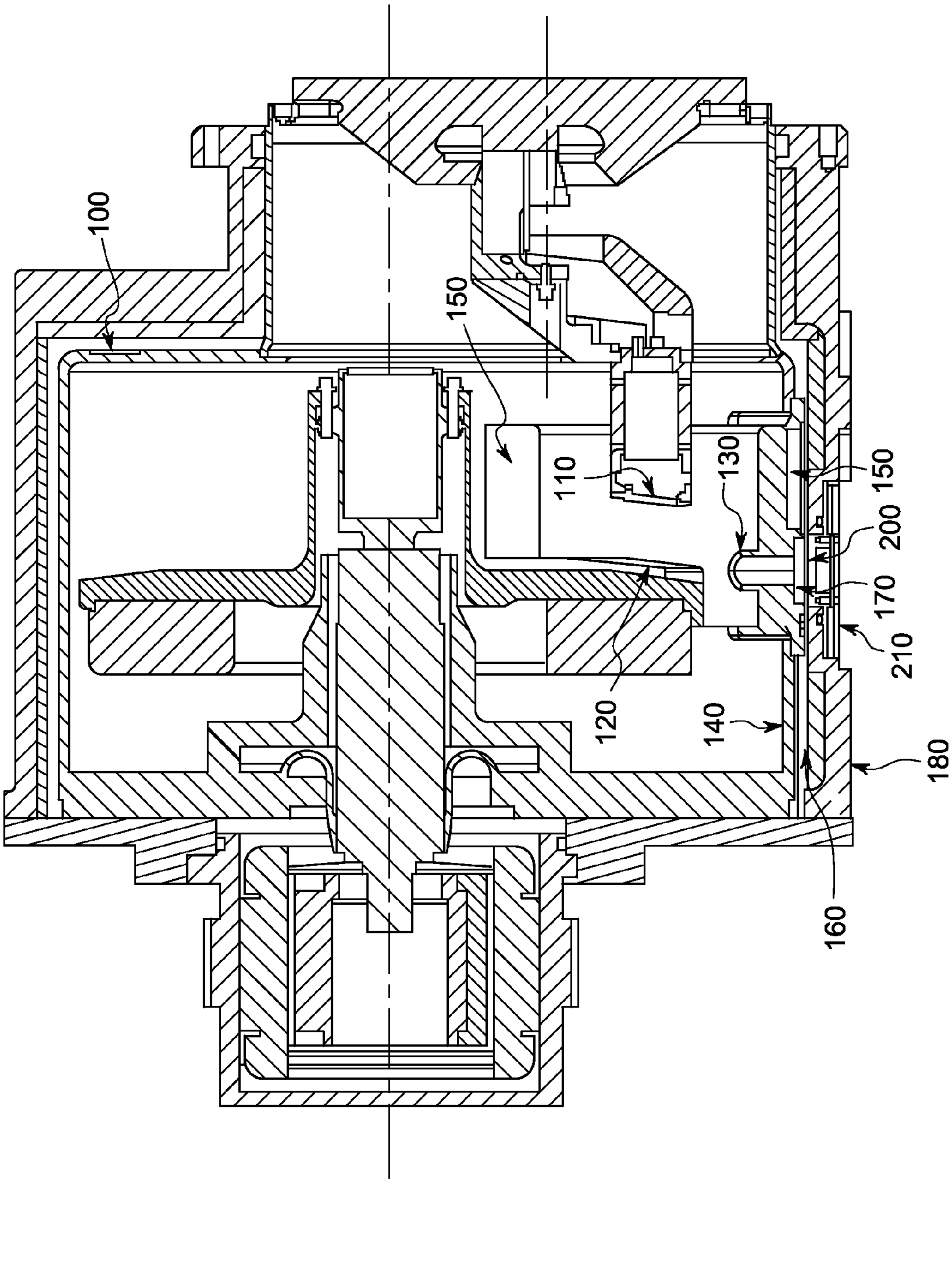
FIG. 1 is a cross sectional view of an x-ray system including an x-ray tube contained in a radiation resistant casing.

Referring to FIG. 1 one embodiment involves an X-ray system with an x-ray tube 100 which contains a cathode 110 and an anode 120. A fairly high vacuum is maintained in the interior of the x-ray tube. The cathode 110 is heated to provide a source of free electrons. The anode 120 is maintained at a high positive potential relative to the cathode 110 which causes the free electrons to accelerate and strike the anode 120 at a high velocity generating x-rays. Some of these x-rays pass through a radiation emission passage 130 in the electron collector 150. These x-rays then pass through the x-ray tube wall 140 via a beryllium window 170, which is essentially transparent to x-rays but provides structural integrity to the gap in the x-ray tube wall 140. The beryllium window 170 provides for the emission of the x-rays at the high operating temperatures of the x-ray tube 100. The x-rays then pass through the dielectric oil circulation path 160 and through the radiation resistant casing 180 via an aluminum window 200 and an Ultem window 210. In one embodiment the Ultem window is polyetherimmide, however other materials may also be used. The radiation resistant casing 180 contains a dielectric oil which cools the x-ray tube and minimizes the probability of arcing between the electrical connections for the anode 120 and the cathode 110. The aluminum window 200 provides a path for the x-rays through the radiation resistant casing 180. The Ultem window 210 is essentially transparent to the x-rays but provides protection for the exterior surface of the aluminum window 200.

Figure 2:
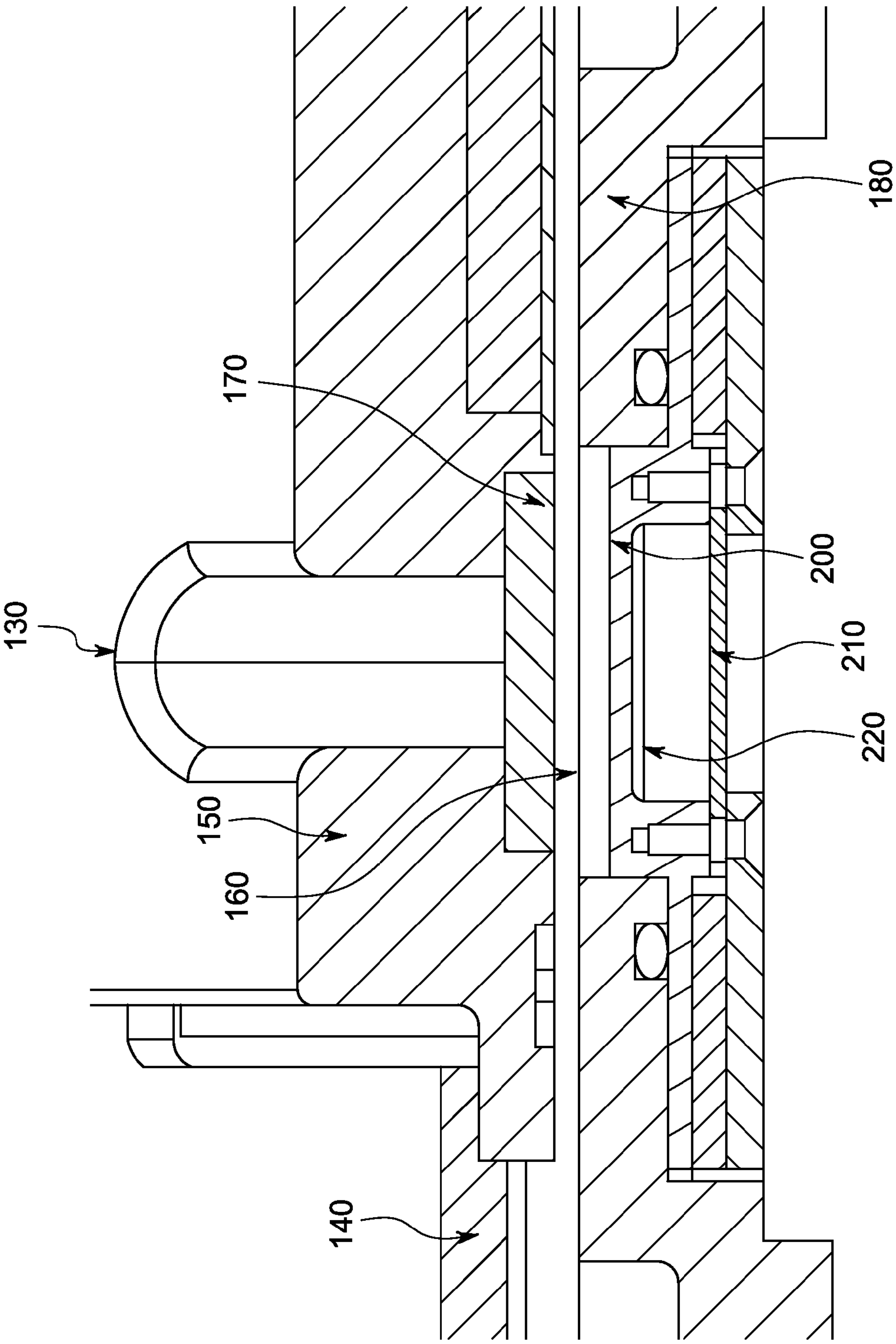
FIG. 2 is a schematic cross sectional view of the portion of the x-ray system of FIG. 1 adjacent to a window with a vapor deposited layer.

Referring to FIG. 2 a physical vapor deposited copper filter 220 of about 75 microns thickness is shown on the exterior surface of the aluminum window 200. The exposed surface of this filter 220 is protected from handling damage by the Ultem window 210 and by the fact that the aluminum window 200 has a recessed exterior surface. In one embodiment Ultem window 210 may be removed.

Figure 3:
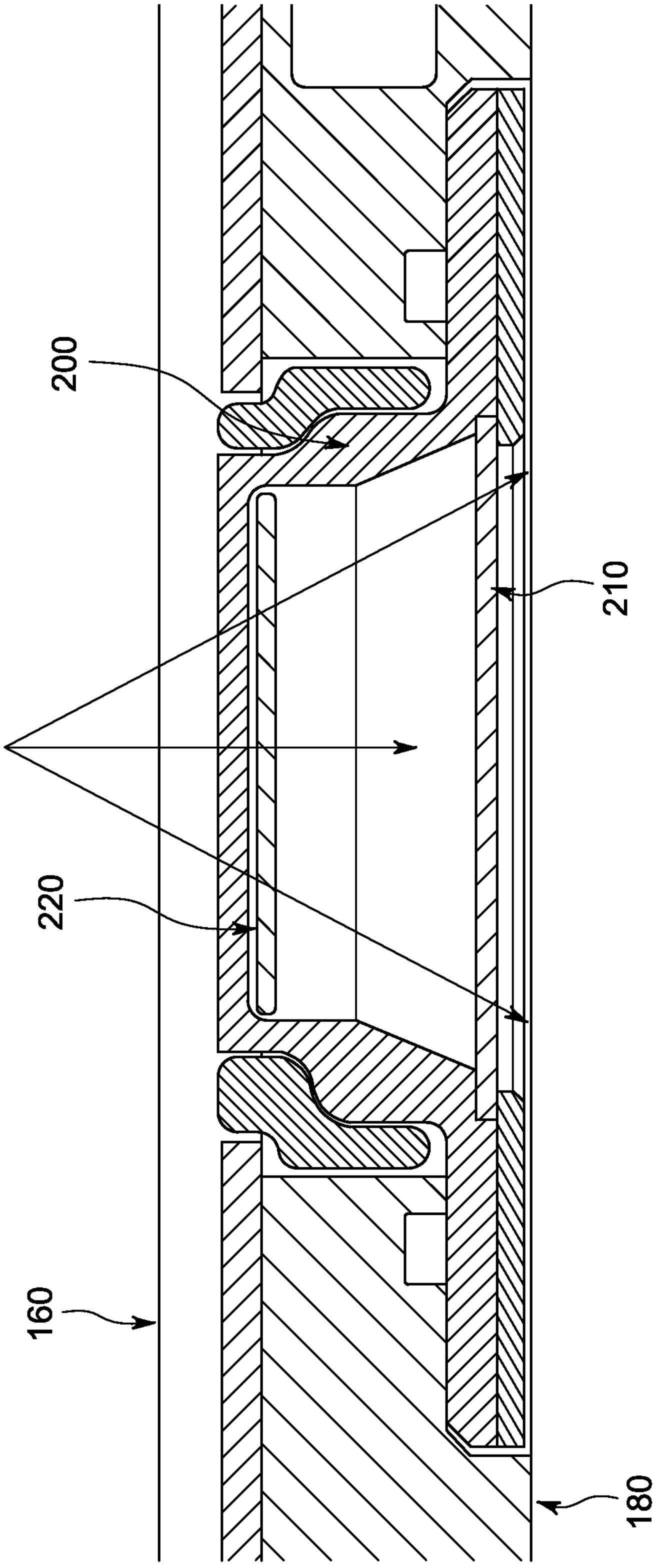
FIG. 3 is a schematic cross sectional view of the window and its immediate environment.

Referring to FIG. 3 the x-ray beam 230 is shown passing through the dielectric oil circulation path 160 and then the aluminum window 200 and the physical vapor deposited copper filter 220, which both condition the beam by the absorption or attenuation of some of the x-rays. In this way the X-ray beam is conditioned in this embodiment to be suitable for medical imaging of human patients. Among other things the "softer" x-rays likely to be absorbed by the tissue of the patient have been attenuated or removed. Finally, the beam 230 passes through the Ultem filter 210, which is essentially transparent to the x-rays.

The layer of filtering metal may be deposited by any of the known physical or chemical vapor deposition methods with the modification that the deposited layer is sufficiently thick to effectively condition the x-rays passing through it. Vapor deposition methods provide for a reproducible deposit of a layer of reasonably uniform composition and thickness so that the x-ray conditioning behavior is fairly consistent within each window and between multiple windows manufactured to the same specification. This deposition technique minimizes the formation of mixtures of the substrate material, i.e. the surface of the window on which the layer is being deposited, and the metal being deposited. This facilitates the design of windows with particular conditioning characteristics as these characteristics can be reproducibly predicted from the identity and thickness of the filtering layer without having to account for the effect of unintended mixtures of materials.

Suitable physical vapor deposition techniques include those involving creating a vapor of the metal to be deposited under reduced pressure of an inert gas and causing the vapor to condense on the substrate which will carry the layer by the application of an electrical potential. In one embodiment a magnetron is used to generate the vapor. In one embodiment the surface to which the layer is to be applied is cleaned by bombardment of ionized atoms of the inert gas before exposing this surface to the vapor. It is convenient to use an inert gas whose atomic number is reasonably close to that of the metal being deposited. For instance it is convenient to use argon when creating a layer of copper.

Suitable chemical vapor deposition techniques include those involving a chemical reaction which results in a vapor of the metal to be deposited being condensed on the substrate which will carry the layer. It is convenient to create a vapor of a chemical compound involving the desired metal and then to release the metal from the compound creating a vapor of the metal itself.

The layer of vapor deposited metal should be thick enough to cause a significant attenuation of the x-rays passing through it. Conditioning the x-ray beam with a filter removes or at least greatly reduces the presence of certain components of the x-ray spectrum generated by the impact of electrons on the anode target. For instance, X-rays used for the medical imaging of human patients are commonly filtered through a thick copper layer to remove all or a substantial portion of the "softer" x-rays which are likely to be absorbed by the tissue of the human patient as opposed to passing through this tissue. In one embodiment the vapor deposited metal layer is at least about 10 microns in thickness. In another embodiment it is between about 10 and 200 microns in thickness. In a further embodiment it is between about 50 and 150 microns in thickness. It may be convenient to employ a thickness of about 75 microns, particularly if the deposited metal is copper. The thickness may be readily tailored to achieve a desired x-ray conditioning effect.

The thickness of the layer of vapor deposited metal should be fairly uniform and reproducible between windows carrying such layers. In one embodiment the thickness is within plus or minus 2 microns of the nominal thickness intended. Thus for this embodiment a layer with a target thickness of 33 microns the thickness observed across a number of windows carrying such layers should be between 31 and 35 microns. This may be contrasted to the plus or minus seven micron tolerance common when the filter is formed from a rolled sheet material as opposed to a vapor deposited layer.

The layer may be of any metal which is amenable to one or more vapor deposition techniques and has desirable x-ray conditioning properties. These metals include Aluminum, Copper, Molybdenum, Tin, Titanium, Tungsten and Zirconium. It is not necessary that the metal have good cold or hot workability or ductility.

More than one layer may be deposited on the window to condition the x-rays. By varying the identity and thickness of multiple layers of vapor deposited metal conditioning effects can be tailored to meet particular needs. In one embodiment a layer of copper is vapor deposited followed by a layer of carbon and then followed by a layer of titanium. In this case one of the filtering layers was not a metal but it was sandwiched between two vapor deposited metals. In one embodiment the copper layer is about 50 microns in thickness while that of the carbon is about 25 microns and that of the titanium is about 40 microns.

The layer is deposited on a surface of the window through which the x-ray beam used for imaging passes in exiting the radiation resistant casing. In one embodiment this is the external surface of the window. Because the vapor deposited metal forms a good bond with the surface on which it is deposited it is also possible to place it on the interior surface of the window which faces the dielectric oil circulation path without undue concern that the oil will wick between the layer and the window surface.

The window may be constructed of any of the materials commonly used to allow the emission of an x-ray beam from an x-ray system with a radiation resistant casing. In one embodiment the window is fabricated of an appropriate material and has an appropriate thickness to contribute to the conditioning of the x-ray beam for its intended use. In one embodiment the window is fabricated of high purity aluminum. In one embodiment the window is inset such that its exterior surface is closer to the interior of the system than the exterior surface of the adjacent portion of the radiation resistant casing into which it is placed. This provides a recess which protects the surface of the vapor deposited layer from handling damage and also minimizes the thickness of the dielectric oil circulation path which passes in front of the window. This in turn minimizes the probability that turbulence or air bubbles in the dielectric oil will cause x-ray artifacts when the system is used for imaging.

The combination of the vapor deposited layer or layers and the window conditions the x-ray beam exiting the radiation resistant casing for imaging a particular type or class of target. In one embodiment the x-ray beam is conditioned for the medical imaging of human patients.

Working Example of Physical Vapor Deposition

A copper layer of about 33 microns was generated on a high purity aluminum window fixture using a magnetron based physical vapor deposition process to yield composite suited to serve as a window for the radiation resistant casing enclosing an x-ray tube and to condition the x-rays passing through it for medical imaging of human patients. The window fixture was ultrasonically cleaned in alcohol for 5 minutes . and all surfaces of window fixture that were not to be coated with copper were masked. The window fixture was then placed in a vacuum chamber which was then evacuated to $3.0\times10^{-6}$ Torr. The window fixture was held in vacuum at less than $3.0\times10^{-6}$ Torr for one hour. The window fixture was then subject to 2 minutes of Argon ion scrubbing at 2.0 kV and 89 mA in a 17.5 mTorr Argon atmosphere. A copper vapor was supplied to the coating chamber by energizing a magnetron to 500 Watts for 60 minutes using a ramp rate of 8 seconds. A Torus Magnetron system from Kurt J Lesker™ Vacuum (Product Number TM3FS10XBS) with a 3" diameter target was used. A 500VDC bias voltage was applied to the window fixture. The chamber pressure was adjusted to about 5 mTorr so that the magnetron plasma current and voltage were 1.59A and 256V, respectively. The deposition rate on the fixture was in excess of about 0.11 Å/sec. After about 60 minutes a copper layer of 33 microns had been generated.

Working Example of Analysis

An elemental analysis of a cross section of a composite prepared in the manner described in the coating example at various distances from the aluminum/copper junction was performed by scanning electron microscopy (SEM) using a sampling square of 1.6 microns. The results are reported in the table below.

| Distance in Microns from | Wt % of Elements Detected | | | | |
|---|---|---|---|---|---|
| Boundary Starting from Cu side | Al | Cu | Si | Ag | Fe |
| 12 | | 100.00 | | | |
| 9 | 0.65 | 99.35 | | | |
| 6 | 0.57 | 99.43 | | | |
| 3 | 6.44 | 93.56 | | | |
| 1 | 41.84 | 57.41 | 0.18 | | 0.57 |
| 0 | 49.69 | 50.16 | 0.15 | | |

-continued

| Distance in Microns from Boundary Starting from Cu side | Wt % of Elements Detected | | | | |
|---|---|---|---|---|---|
| | Al | Cu | Si | Ag | Fe |
| 0.5 | 57.92 | 40.89 | 0.16 | 0.37 | 0.66 |
| 1 | 73.30 | 24.28 | 0.21 | 1.05 | 1.16 |
| 2 | 80.71 | 14.81 | 0.32 | 1.84 | 2.31 |
| 3 | 84.32 | 9.02 | 0.30 | 2.70 | 3.66 |
| 3-4 | 91.74 | 2.66 | 0.33 | 5.28 | |
| 4 | 88.88 | 4.07 | 0.47 | 4.00 | 2.59 |
| 5.5 | 91.94 | 1.37 | 0.46 | 5.56 | 0.67 |

The results show that the degree of intermixing of the aluminum and copper is minimal enough that the two layers can function effectively in conditioning x-rays as distinct layers.

It is important to note that the construction and arrangement of an x-ray system as described herein is illustrative only. Although only a few embodiments of the present invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements and vice versa, the position of elements may be reversed or otherwise varied, and the nature of number of discrete elements or positions may be altered or varied. Accordingly, all such modifications are intended to be included within the scope of the present invention to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. An x-ray system with one or more conditioning filters comprising:

an x-ray tube containing:

a cathode which supplies electrons; and an anode which can be maintained at high positive electrical potential to the cathode and has a target area which is impacted by electrons from the cathode when the positive potential is maintained generating x-rays;

a radiation resistant casing which encloses the x-ray tube; and a window in the radiation resistant casing which allows some of the x-rays generated at the target area to exit the system, with the window having a vapor deposited layer of a filtering metal of sufficient thickness to effectively condition the x-rays passing through the window and located to intercept the x-rays passing through the window; wherein the window is constructed of high purity aluminum; and wherein the vapor deposited layer of filtering metal is selected from the group consisting of high purity copper, molybdenum, tin, titanium, tungsten, and zirconium.

2. The x-ray tube of claim 1 wherein the window is of sufficient thickness to effectively condition the x-rays passing through it.

3. The x-ray system of claim 1 wherein the layer of filtering metal is created by physical vapor deposition.

4. The x-ray system of claim 1 wherein the layer of filtering metal is created by chemical vapor deposition.

5. The x-ray system of claim 1 wherein the layer of deposited filtering metal is at least about 10 microns thick.

6. The x-ray system of claim 1 further including an additional layer over the vapor deposited layer of filtering material that is a second material different from the filtering material.

7. The x-ray system of claim 1 wherein the layer of deposited filtering metal is on the exterior surface of the window.

8. The x-ray system of claim 1 wherein the exterior surface of the window is inset from the exterior surface of the radiation resistant casing.

9. The x-ray system of claim 1 wherein the window and the layer of filtering metal together condition the x-rays passing through them to be suitable for use in the medical imaging of human patients.

10. An x-ray system which generates conditioned x-rays suitable for the medical imaging of human patients comprising:

an x-ray tube containing:

a cathode which supplies electrons; and an anode which can be maintained at high negative electrical potential to the cathode and has a target area which is impacted by electrons from the cathode when the negative potential is maintained generating x-rays;

a radiation resistant casing which encloses the x-ray tube; and a high purity aluminum window in the radiation resistant casing which allows some of the x-rays generated at the target area to exit the system, the window being of sufficient thickness to partially condition the exiting x-rays and having a vapor deposited layer of high purity copper of between about 50 and 150 microns in thickness to complete the conditioning of the x-rays passing through the window and located to intercept the x-rays passing through the window.

11. A process for the construction of an x-ray system with one or more conditioning filters having:

an x-ray tube containing:

a cathode which supplies electrons; and an anode which can be maintained at high positive electrical potential to the cathode and has a target area which is impacted by electrons from the cathode when the positive potential is maintained generating x-rays;

a radiation resistant casing which encloses the x-ray tube; and a window in the radiation resistant casing which allows some of the x-rays generated at the target area to exit the system, with the window having a layer of a filtering metal of sufficient thickness to effectively condition the x-rays passing through the window and located to intercept the x-rays passing through the window, the process comprising vapor depositing the layer of filtering metal on a surface of the window; wherein the window is constructed of high purity aluminum; and wherein the layer of filtering metal is selected from the group consisting of high purity copper, molybdenum, tin, titanium, tungsten, and zirconium.

12. The process of claim 11 wherein the layer of filtering metal is created by physical vapor deposition.

13. The process of claim 12 wherein the physical vapor deposition involves the use of a magnetron.

14. The process of claim 11 wherein the layer of filtering metal is deposited on the exterior surface of the window.

15. The process of claim 11 wherein the layer of filtering metal is created by chemical vapor deposition.

16. The process of claim 11 wherein an additional layer of material is deposited over the layer of filtering metal.

17. The process of claim 16 wherein the additional layer is not the same material as the vapor deposited layer of filtering metal.

* * * * *